United States Patent [19]

Eyrainer

[11] Patent Number: 5,797,620
[45] Date of Patent: Aug. 25, 1998

[54] KNEE GUARD DEVICE

[75] Inventor: Heinz Eyrainer, Waldstetten, Germany

[73] Assignee: TRW Occupant Restraint Systems GmbH, Alfdorf, Germany

[21] Appl. No.: 748,571

[22] Filed: Nov. 13, 1996

[30] Foreign Application Priority Data

Nov. 13, 1995 [DE] Germany .............. 295 17 953 U

[51] Int. Cl.⁶ .................................................. B60R 21/22
[52] U.S. Cl. .................... 280/730.1; 280/732; 280/743.1
[58] Field of Search ............................ 280/730.1, 732, 280/730.2, 728.1, 729, 743.1, 752, 753, 733

[56] References Cited

U.S. PATENT DOCUMENTS

| | | | |
|---|---|---|---|
| 3,784,223 | 1/1974 | Hass et al. .................. | 280/730.1 |
| 3,951,427 | 4/1976 | Wilfert ........................ | 280/732 |
| 5,161,820 | 11/1992 | Vollmer ...................... | 280/730.1 |
| 5,312,131 | 5/1994 | Kitagawa et al. ........... | 280/730.1 |
| 5,322,322 | 6/1994 | Bark et al. .................. | 280/730.2 |

FOREIGN PATENT DOCUMENTS 43 07 175  9/1993  Germany .................. 280/730.2

*Primary Examiner*—Peter C. English
*Attorney, Agent, or Firm*—Tarolli, Sundheim, Covell Tummino & Szabo

[57] ABSTRACT

A knee guard device for vehicle occupants comprises a gas bag arranged in the vehicle in a knee well for the vehicle occupant. In its non-inflated state, the gas bag has a length along an imaginary center axis in the axial direction which enables the gas bag to be installed substantially bow-shaped around the knee well in the vehicle. Upon inflation, the length of the gas bag is so reduced that it is tightened between its axial ends to be able to bear radial forces exerted to it by the knees of the occupant.

16 Claims, 3 Drawing Sheets

KNEE GUARD DEVICE

TECHNICAL FIELD

The invention relates to a knee guard device for vehicle occupants comprising a gas bag arranged in the vehicle in a knee well for the vehicle occupant. Furthermore, the invention relates to a knee restraint system having a knee guard device arranged at each of the driver's and the co-driver's side of the vehicle.

BACKGROUND OF THE INVENTION

A knee guard device comprising a gas bag is disclosed in the German patent application 2,146,258, such device being part of a vehicle occupant protective device having a large surface. This protective device comprises a plurality of gas bag chambers, one chamber being generally at the upper body of the vehicle occupant and the other chamber extending in the well left free for the knees. This prior art protective device is arranged in a dashboard just underneath a glove compartment so that the gas bag may inflate even as far as a point generally at the upper body of the vehicle occupant when an accident occurs. However, a disadvantage with this known device is that it only can be installed at the glove compartment so that either the glove compartment itself or the well left for the knees must be limited in size. The space available for fitting other equipment in the dashboard is accordingly reduced by this known protective device.

SUMMARY OF THE INVENTION

The invention provides an improved knee guard device for vehicle occupants which may be integrated in the vehicle in any desired manner without reducing the safety of such occupants so that the space available for the installation for devices in the dashboard and in the space left for the knees is less restricted.

In accordance with the invention a knee guard device is provided comprising a tube-shaped gas bag. The gas bag has a flexible wall with axial ends at which the gas bag is secured to the vehicle. The length along an imaginary center axis in the axial direction in a non-inflated state enables the gas bag to be installed substantially bow-shaped around the knee well in the vehicle. Upon inflation of the gas bag, the length is so reduced that the gas bag is tensioned in the axial direction and tightened between its axial ends in front of the knees of the occupant. The gas bag extends across the knee well to be able to bear radial forces exerted on it by the knees in the case of an impact and to restrain the knees. Therefore, the gas bag may be trained around devices accomodated in the dashboard so that the possibilities of arrangement for the devices in the dashboard itself are hardly limited by the knee guard device. Should an accident occur the gas bag will become shorter in the longitudinal direction thereof so that, since it is secured at its axial ends, it will emerge from its covered compartment and extend into the foot space in the vehicle. The gas bag in accordance with the invention accordingly develops a twin function, since on the one hand it acts as a damping cushion effective for the vehicle occupant's knees thrust into the gas bag when an accident occurs and on the other hand limits forward movement of the entire thigh and pelvic regions of such vehicle occupant should an accident occur, from the very start. There is, therefore, no development of undesirably high acceleration levels for the thigh and pelvic regions of the body.

According to a preferred embodiment the gas bag material possesses a weave that causes a shortening of the gas bag in the longitudinal direction thereof during inflation. For instance, the gas bag material may have such a weave that no fibers extend exclusively in the longitudinal direction of the gas bag but rather only helically along the gas bag in the envelope thereof.

In accordance with an advantageous further development of the gas bag in accordance with the invention, the same may be secured at one axial end generally at the center console and/or at its other axial end generally at the A column to the vehicle, that is to say a point, where there is generally more space for respective attachment means. As seen in the direction of travel the gas bag is accordingly essentially secured laterally to the left and to the right in front of the knees so that in the inflated state it will extend like a belt in front of the knees and athwart same. This further development of the invention means that it is now unnecessary to make the dimensions of the gas bag so large that it fills the entire space left available for the knees, since if there is an accident the gas bag no longer has to bear against the dashboard itself and its able to be tension loaded.

A further development of the knee guard device in accordance with the invention contemplates an arrangement in which at one or more attachment points of the gas bag at least one gas generator associated with the gas bag is integrated into the vehicle at the center console and/or generally at the A column.

In keeping with another advantageous embodiment generally at the edge of the dashboard the gas bag is arranged in the foot well of the vehicle, where it cannot restrict the space allowed for other devices provided in the dashboard for the driver or co-driver, as for example switches, the steering column or the glove compartment. The knee guard device may in this respect be arranged concealed behind the dashboard or also behind another cover generally at the foot space near the edge of the dashboard itself. The dashboard then hardly has to be adapted to the gas bag and rather the reverse is the case, i. e. the gas bag is substantially able to be adapted to the dashboard by being arranged along the edge of the dashboard in the foot space like an as yet uninflated piece of flexible tubing.

The invention further provides a knee restraint system for the driver's and the co-driver's side. In such system , a previously described individual knee guard device in accordance with the invention is arranged respectively on the driver's and co-driver's side of the vehicle. The gas bags belonging to the individual knee guard devices are connected with one another generally at the middle of the vehicle so that corresponding attachment devices may be formed between the gas bags in a simple manner. Furthermore, in the case of a simultaneous triggering of the driver's and co-driver's gas bag there will be not too much asymmetrical load on the attachment device generally at the middle of the vehicle.

Both for the gas bag on the driver's side and also for that on the co-driver's side it is possible to provide one or more separate gas generators. It is, however, also feasible to have a common gas generator for both gas bags which additionally may be optionally integrated in the center console or in the dashboard. There is particularly more space available for the accommodation of attachment elements for the gas bag or for one or more gas generators at the center console so that there will be a greater freedom for the designer for the configuration of the dashboard in the part directly in front of the vehicle occupant.

In addition to the unvaryingly synchronous operation of the two gas bags it is possible in accordance with another

3 alternative embodiment of the invention to inflate only one individual gas bag by having separate gas sources for each individual gas bag. If, accordingly, only the driver's seat is occupied, then in the case of a crash only the respective gas bag on the driver's side will be activated. This is particularly economical, since after a crash for repair of the vehicle it is only on one side that a new knee guard device must be installed.

BRIEF DESCRIPTION OF THE DRAWINGS

Further features and advantages of the invention will be gathered from the following description and from the drawings, to which reference is made.

DETAILED DESCRIPTION OF THE INVENTION

Figure 1:
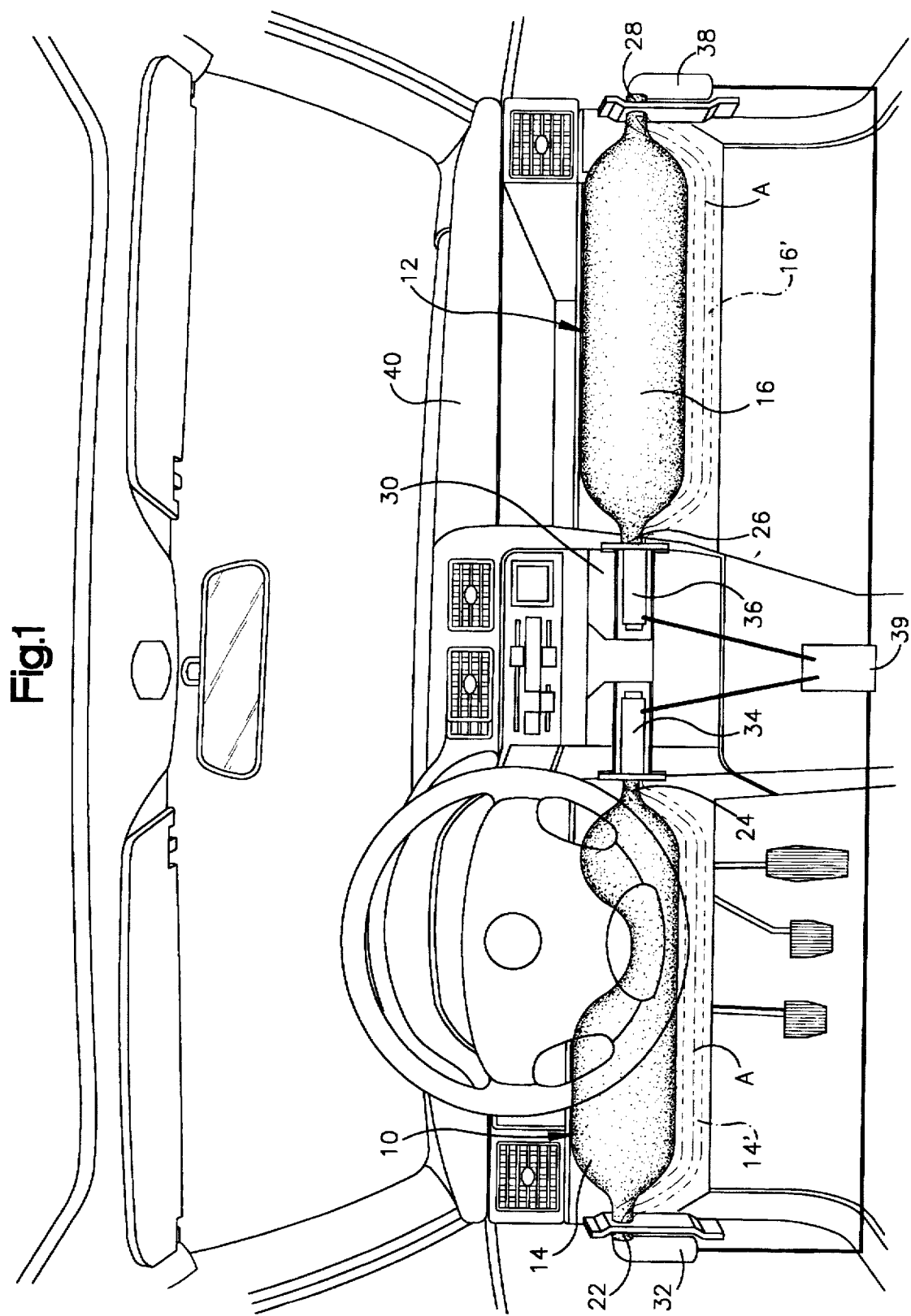
FIG. 1 shows, looking in the direction of travel, the interior space of a vehicle generally adjacent to the dashboard to indicate the knee guard device in accordance with a first embodiment of the invention in the activated and non-activated state on the driver's and co-driver's side.

In FIG. 1, a knee guard device for vehicle occupants is illustrated, which comprises a knee guard device 10 for the driver's side and a knee guard device 12 for the co-driver's side.

For its part each individual knee guard device 10 and 12 includes a gas bag 14 and 16, which is designed in the form of a flexible tube having a flexible wall in the form of a weave. The non-activated gas bag on the driver's side is shown in dotted lines by reference numeral 14' and the non-activated gas bag on the co-driver's side is also shown in dotted lines by reference numeral 16'. The activated gas bags are indicated by reference numerals 14 and 16.

Figure 2:
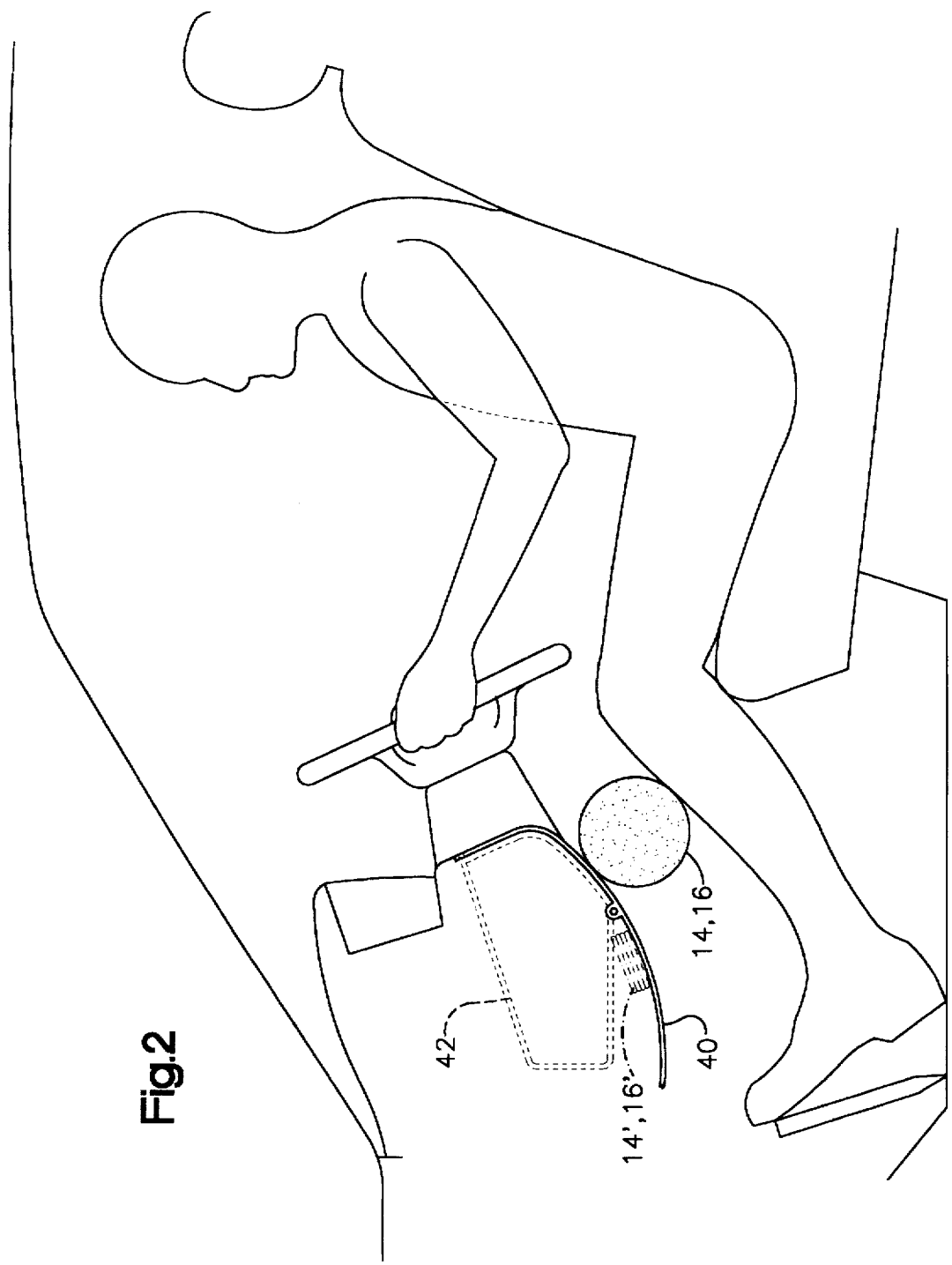
FIG. 2 shows a diagrammatic lateral elevation of the knee guard device of the invention of FIG. 1 in the activated and non-activated state.

The two gas bags 14' and 16', in the non-activated state, as shown in FIG. 2, each have a length along an imaginary center axis A in the axial direction in the non-inflated state which enables the gas bags 14' or 16' to be arranged behind the dashboard 40 generally at the edge thereof in the foot well. On the driver's side, the gas bag 14' is arranged at a distinctly lower level than the steering column. On the co-driver's side, the gas bag 16' is placed underneath a glove compartment 42 as shown in FIG. 2 in broken lines without the interior capacity of the glove compartment 42 having to be reduced in size as compared with a conventional glove compartment owing to the presence of the gas bag 16'. Each gas bag 14 and 16 consequently extends athwart the direction of travel and is secured at its end 24 and 26, respectively, generally at the middle of the vehicle generally at the center console 30, which has a respective recess for receiving the ends 24 and 26. The ends 22 and 28 generally at the outer side of the vehicle, of the gas bags 14 and 16 , respectively, are attached to the vehicle generally at the A column. In this respect, the two attachment points of each gas bag 14 and 16 are generally at the knee level of the vehicle occupant and preferably to the left and to the right , respectively, of the respective knee of a vehicle occupant.

4

At each axial end 22, 24 and 26, 28 of the gas bags 14 and 16 , respectively, a respective gas generator 32, 34, 36 and 38 is arranged, the gas generators 34 and 36, which are associated with the ends 24 and 26 , respectively, of the gas bags 14 and 16 , respectively, being respectively integrated in the center console 30. The gas generators 32 and 38, which are associated with the ends 22 and 28, , respectively, are integrated in the vehicle generally at the A column. The gas generators 32 and 38 may in this respect be installed to the side in the dashboard or furthermore in a vehicle door itself.

The gas generators 32, 34 and 36, 38 of the gas bags 14 and 16, respectively, possess respectively separate discharge ducts and correspondingly separate firing devices, which are coupled with a respective, schematically illustrated device 39, for checking occupancy of a seat. The device 39 for checking occupation of a seat comprises in this case a pressure sensor integrated in the seat to respond to occupancy of the seat or a sensor integrated in the restraining belt, which responds to fastening thereof and a control unit.

Should there be a crash, when the device for checking seat occupancy detects the presence of the driver and possibly of a co-driver, the pyrotechnic gas generators 32 and 34 and if needed the gas generators 36 and 38 are activated. Via corresponding passage openings at the axial ends 22, 24, 26 and 28 the gases released will then flow into the interiors of the gas bags 14 and 16 causing same to deploy. Usually, there is only provided a sensor to respond to occupancy of the co-driver's seat.

Because the gas bag material possesses such a weave that on inflation the tubular gas bag becomes shorter than in its condition before inflation, such gas bag 14 or 16, which in the non-inflated state extends in an arc around the knees of the respective vehicle occupant, will spring out of the dashboard and extend in a substantially linear manner between its anchored ends 22, 24 or 26, 28. During such process a heavy tensile strain is developed in the fabric. The gas bags 14, 16 are tensioned in the axial direction and tightened between the ends 22, 24, 26, 28 in the front of the knees. Accordingly, as shown in FIG. 2, the gas bags 14 and 16 on the driver's side and the co-driver's side will be flung out toward the knees of the vehicle occupant. Each gas bag 14 and 16 will form a hose extending directly in front of and athwart the knees of a vehicle occupant and be able to bear radial forces exerted on it by the knees. Therefore, a restraining function is provided for thigh and pelvis of the vehicle occupant.

In the case of a crash, there is consequently an extremely prompt restraint for the entire lower torso portion of a vehicle occupant with the result that the acceleration values and the speed of the lower torso part in relation to the vehicle are kept relatively low and the kinetic energy to be taken up by the knee guard devices 10 and 12 is distinctly less than with conventional knee guard devices.

It is, therefore, unnecessary to furnish the gas bags 14 and 16 with discharge means in the form of openings or the like, since the internal pressure of the inflated gas bags 14 and 16 is relatively high as compared with conventional gas bags. Despite the relatively small effective impingement area of the knees, owing to their excellent restraining action and the additional damping effect the knee guard devices 10 and 12 constitute a high quality common knee guard device for the entire lower torso region.

Additional padded impact surfaces or parts designed to deform at the dash or the steering column are superfluous. Owing to the arrangement of the gas bags 14 and 16 generally at the outer edge of the dash, i. e. clearly spaced from the knees of the vehicle occupants, there are no limitations as regards freedom of the knees or legs of the vehicle occupant. It is not absolutely necessary for one gas bag 14 or 16 to be arranged behind the dash. It would also be possible for it to extend outside the dash athwart the foot well of the vehicle.

Figure 3:
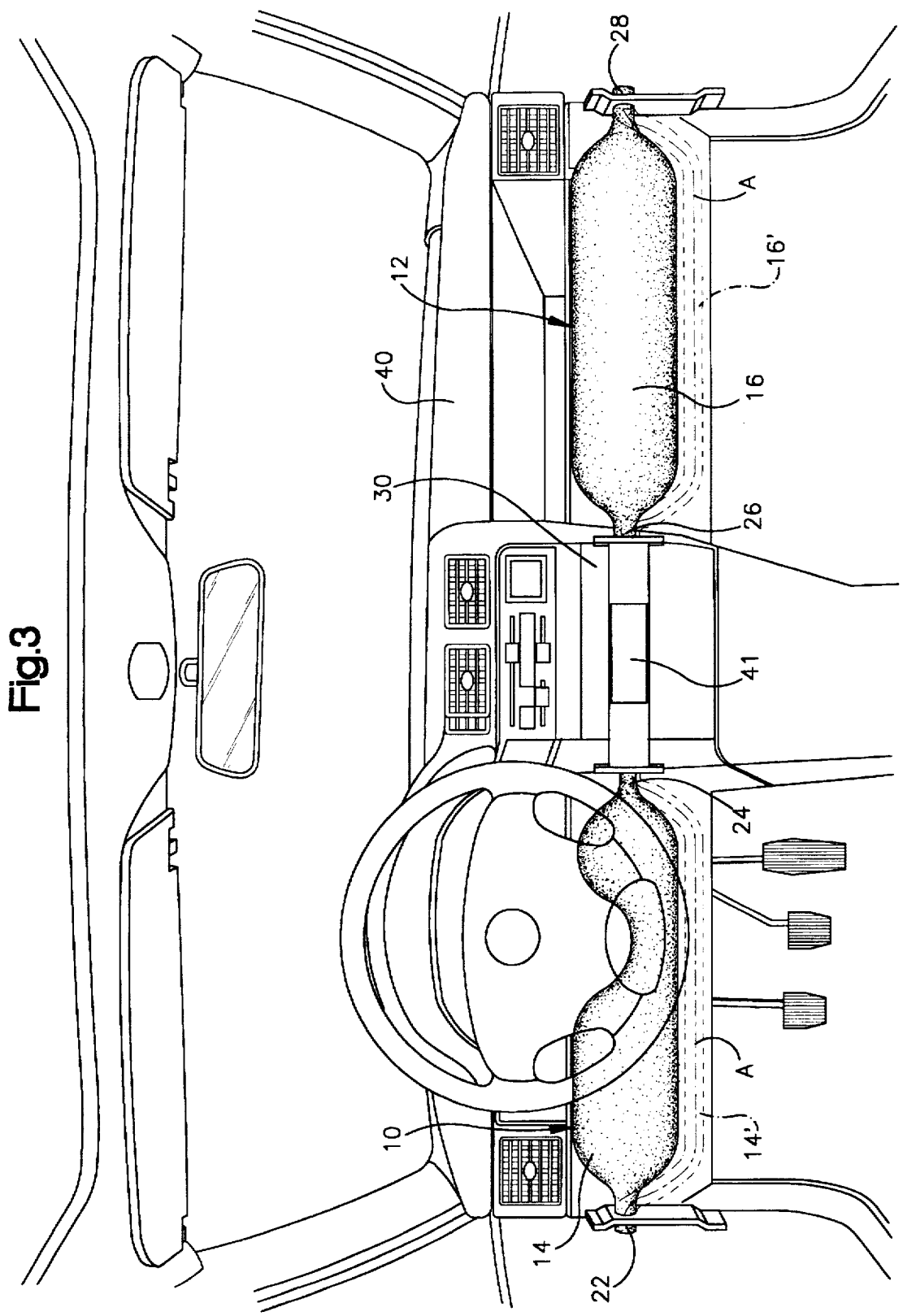
FIG. 3 shows, looking in the direction of travel, the interior space of a vehicle generally adjacent to the dashboard to indicate a knee restraint system according to the invention with knee guard devices for the driver's and co-driver's sides in accordance with the invention in the activated and non-activated state.

In addition to the common knee guard device comprising two separate knee guard devices 10 and 12 it is also possible to connect together the gas bags 14 and 16 of the driver's side and the co-driver's side, respectively, at the center of the vehicle to define a knee restraint system as depicted in FIG. 3.

It is possible, as a departure from the embodiment illustrated in FIG. 1, to provide only one common gas generator 41 for both gas bags 14 and 16, as is shown in FIG. 3, which is then arranged integrated in the center console 30. In this case the two gas bags are synchronously inflated irrespectively of seat occupancy. Since the gas bags 14 and 16 are connected together at their ends 24 and 26, there will be a continuous knee guard device or knee restraint system, which at its left and right ends 22 and 28 is connected with the respective A column of the vehicle so that a common attachment device for the gas bags 14 and 16 generally at the center console 30 only has to take up a load in the direction of travel.

I claim:

1. A knee guard apparatus arranged in a vehicle having a driver's side and a co-driver's side, a seat at each of the sides, a knee well in front of each seat in which the lower legs and the knees of an occupant sitting on each respective seat extend, a center console, a dashboard, and an A-column, said knee guard apparatus comprising:

at least one gas generator; and a tube-shaped gas bag inflatable by said at least one gas generator, said gas bag having a flexible wall with axial ends at which said gas bag is secured to the vehicle and, in a non-inflated state, a length along an imaginary center axis in an axial direction enabling said gas bag to extend in a substantially bow-shaped configuration around one of the knee wells in the vehicle, said length being reduced upon inflation of said gas bag by said at least one gas generator so that said gas bag is tensioned in said axial direction and tightened between its axial ends across said one knee well in front of the knees of an occupant to absorb radial forces exerted on said gas bag by the occupant's knees and to restrain the occupant's knees in the event of a vehicle collision.

2. The knee guard apparatus of claim 1 wherein said flexible wall is made of a gas bag material having a weave that, upon inflation of said gas bag, causes said flexible wall to become shorter than said length in said non-inflated state.

3. The knee guard apparatus of claim 1 wherein one of said axial ends of said gas bag is secured to the center console of the vehicle and the other of said axial ends of said gas bag is secured to the A-column of the vehicle.

4. The knee guard apparatus of claim 1 wherein said gas bag is secured at one of its axial ends to one of the center console of the vehicle and the A-column of the vehicle.

5. The knee guard apparatus of claim 1 wherein said at least one gas generator comprises two gas generators, said gas generators being arranged at one or more attachment points of said gas bag, one of said gas generators being integrated into the center console of the vehicle and the other of said gas generators being arranged generally at the A-column in the vehicle.

6. The knee guard apparatus of claim 1 wherein said at least one gas generator is integrated into the center console in the vehicle and is arranged at one or more attachment points of said gas bag.

7. The knee guard apparatus of claim 1 wherein said at least one gas generator is arranged at the A-column in the vehicle and at one or more attachment points of said gas bag.

8. The knee guard apparatus of claim 1 wherein the dashboard has an outer edge and said gas bag is arranged generally at the outer edge of the dashboard in a foot well of the vehicle.

9. The knee guard apparatus of claim 1 further comprising a device for checking occupancy of at least one of the seats in the vehicle and which is operatively coupled to said at least one gas generator, said device allowing ignition of said at least one gas generator only if said at least one seat is occupied.

10. The knee guard apparatus of claim 1 wherein the vehicle has a center defined between the driver's side and the co-driver's side, said knee guard apparatus further comprising another tube-shaped gas bag having a flexible wall with axial ends at which said another gas bag is secured to the vehicle and a length in said axial direction in a non-inflated state enabling said another gas bag to extend in a substantially bow-shaped configuration around another of the knee wells in the vehicle, said length of said flexible wall of said another gas bag being reduced upon the inflation, one of said gas bags being arranged at the driver's side and the other of said gas bags being arranged at the co-driver's side, said one gas bag at the driver's side being connected with said other gas bag at the co-driver's side at the center of the vehicle.

11. The knee guard apparatus of claim 10 wherein said at least one gas generator inflates both of said gas bags.

12. The knee guard apparatus of claim 10 wherein said at least one gas generator is integrated into one of the center console and the dashboard.

13. The knee guard apparatus of claim 10 wherein said flexible wall of each of said gas bags is made of a gas bag material having a weave that, upon inflation of each of said gas bags, causes said flexible walls to become shorter than said respective lengths of said flexible walls in said respective non-inflated states.

14. The knee guard apparatus of claim 10 wherein one axial end of each of said gas bags is secured to one of the center console of the vehicle and the A-column of the vehicle.

15. The knee guard apparatus of claim 10 wherein each of said gas bags is secured at one of its ends at the center console and at the other of its axial ends at the A-column.

16. The knee guard apparatus of claim 10 wherein the dashboard has oppositely disposed outer edges and each of said gas bags is arranged generally at one of the outer edges of the dashboard in a respective foot well of the vehicle.

* * * * *